United States Patent
Geissler et al.

(10) Patent No.: US 9,789,559 B2
(45) Date of Patent: Oct. 17, 2017

(54) SYSTEM AND METHOD FOR CONTROLLING MULTIPLE PROCESSES IN A WELDING-TYPE POWER SOURCE USING A REFINED CONTROLLER ARCHITECTURE

(75) Inventors: Steven J. Geissler, Ft. Collins, CO (US); Todd G. Batzler, Hortonville, WI (US); Michael D. Madsen, Fremont, WI (US)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 1642 days.

(21) Appl. No.: 11/876,246

(22) Filed: Oct. 22, 2007

(65) Prior Publication Data

US 2009/0101637 A1    Apr. 23, 2009

(51) Int. Cl.
    *H05B 6/04*     (2006.01)
    *B23K 9/10*     (2006.01)
    *H02M 3/335*    (2006.01)

(52) U.S. Cl.
    CPC ................................. *B23K 9/1062* (2013.01)

(58) Field of Classification Search
    CPC .................................................. B23K 9/1062
    USPC ...... 219/130.1, 660, 130.51, 130.21, 130.31, 219/130.32, 130.33, 137 PS; 362/142; 363/16
    See application file for complete search history.

(56) References Cited

U.S. PATENT DOCUMENTS

| | | |
|---|---|---|
| 6,365,868 B1 | 4/2002 | Borowy et al. |
| 6,930,279 B2 | 8/2005 | Myers et al. |
| 7,064,290 B2 | 6/2006 | Blankenship et al. |

(Continued)

FOREIGN PATENT DOCUMENTS

| | | |
|---|---|---|
| CN | 2556848 Y * | 6/2003 |
| EP | 1616654 A | 1/2006 |

OTHER PUBLICATIONS

Heming Li, Yabin Li, Yonglong Peng, "FPGA-based all digital phase-locked loop controlled induction heating power supply operating at optimized ZVS mode" IEEE Region 10 Annual International Conference, Proceedings/Tencon—2006 IEEE Region 10 Conference, Tencon 2006 2007 Institute of Electrical and Electronics Engineers Inc. US, Nov. 14, 2006.*

(Continued)

*Primary Examiner* — Quang Van
(74) *Attorney, Agent, or Firm* — Quarles & Brady LLP

(57) ABSTRACT

A system and method for operating an welding-based power source includes an welding-type power source includes a power conditioner configured to receive power from a power source and condition the power to have characteristics within a predefined set of thresholds and an inverter configured to receive the conditioned power from the power conditioner and convert the conditioned power to AC power. The welding-type power source also includes a rectifier configured to convert the AC power to DC welding-type power to drive a welding-type process and a processor segregated into at least two functional modules. The processor may be a field programmable gate array (FPGA) based processor. A first functional module is configured to control the power conditioner to condition the power to have characteristics within the predefined set of thresholds and a second functional module is configured to control the inverter to convert the conditioned power to AC power.

17 Claims, 3 Drawing Sheets

(56) References Cited

U.S. PATENT DOCUMENTS

| | | | |
|---|---|---|---|
| 7,080,226 B1* | 7/2006 | Patterson | 711/165 |
| 2004/0026400 A1* | 2/2004 | Ptak | 219/390 |
| 2004/0233682 A1* | 11/2004 | Geissler | 363/16 |
| 2006/0011595 A1* | 1/2006 | Daniel et al. | 219/130.1 |
| 2006/0138112 A1 | 6/2006 | Geissler | |
| 2007/0187376 A1 | 8/2007 | Albrecht et al. | |
| 2008/0272099 A1* | 11/2008 | Vogel et al. | 219/130.1 |

OTHER PUBLICATIONS

Heming Li, Et Ala; FPGA-Based All Digital Phase-Locked Loop Controlled Induction Heating Power Supply at Optimized ZVS Mode; 1-4244-0549-1/06 IEEE.

International Search Report, PCT/US2008/079448, 2 pages.

\* cited by examiner

SYSTEM AND METHOD FOR CONTROLLING MULTIPLE PROCESSES IN A WELDING-TYPE POWER SOURCE USING A REFINED CONTROLLER ARCHITECTURE

REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to a welding-type system and, more particularly, to a system and method for controlling multiple processes in a welding-type system using a refined controller architecture including a field programmable gate array (FPGA) based processor.

Welding-type systems, such as welders, plasma cutters, and induction heaters, often include an inverter-based power source that is designed to condition high power to carrying out a desired process. These welding-type power sources, often referred to as switched-mode power supplies, can take many forms. For example, they may include a half-bridge inverter topology, a full-bridge inverter topology, a forward-converter topology, a flyback topology, a boost-converter topology, a buck-converter topology, and combinations thereof.

Regardless of the specific inverter topology employed, referring to FIG. 1, an welding-type power source system 10 typically includes a variety of components, such as a pre-regulator/filter 12, a first rectifier 14, an inverter 16, and a second rectifier 18 that is connected to an output 20. Additionally, some power source systems 10 may include a second inverter 22 in order to provide alternating current (AC) welding-type power. While FIG. 1 is a simplified overview of common components of an welding-type power source system 10, it is contemplated that additional components may be included, such as filtering components, feedback and control loops, and transformers or other converters designed to provide a desired output power characteristic.

The system 10 typically designed to be connected to a supply of power 24 that provides AC power, for example, as received from a utility grid over transmission power lines 26. However, the system 10 may be an engine-driven welding-type system that includes an integrated generator that acts as a source of power. The AC power from the supply of power 20 is conditioned by the pre-regulator/filter 12 and delivered to the rectifier 14 to convert the AC power to direct current (DC) power. Specifically, the rectifier 14 includes a plurality of switches that rectify the AC power and deliver it to a DC bus 28 connected to the inverter 16. The inverter 16 includes a plurality of switching devices (e.g., IGBTs or other semiconductor switches) that are positioned between the positive and negative buses of the DC bus 28. The switches are opened and closed in specific combinations to sequentially generate pulses that are delivered to the second rectifier 18 and, ultimately, to the output 20 with the desired voltage and current characteristics. In this regard, the above-described welding-type power source system 10 is specifically designed for delivering high-power to the output 20 to drive a process such as welding, plasma cutting, and induction heating.

In the most simplistic form, welding-type power sources include at least one active switching device, the inverter 16. As described above, these welding-type power source systems 10 often include multiple, actively-controlled systems, including the pre-regulator/filter 12 and, if included, the second inverter 22. The switching characteristics of the inverter 16 are controlled by processor 30 to, along with the second rectifier 18, produce the desired output power having the desired voltage and current characteristics. In particular, the processor 30 controls the switching characteristics of the inverter 16 based on the desired power output characteristics selected by an operator. Furthermore, the processor 16 receives feedback, generally indicated via feedback lines 32, 34, to actively control the inverter 16 during the welding-type process. For example, the processor 30 receives feedback regarding the actual power characteristics (actual current, peak current, actual voltage, peak voltage, power, and the like) delivered to the output 20 and adjusts the control of the inverter 16 to provide the desired power characteristics to the output 20 overtime. For example, feedback 32, 34 is provided to the processor 30 to effectuate a desired welding-type process, such as metal inert gas (MIG), tungsten inert gas (TIG), and the like and even to effectuate a specific subset of a welding-type process, such as a pulsed-MIG process or a spray-transfer process.

In addition to the actively controlled inverter 16, the pre-regulator/filter 12 is actively controlled by another processor 36 to regulate and condition the power received from the source of power 24, which may or may not provide consistent power characteristics. To this end, the processor 36 is specifically designed to control the pre-regulator/filter 12 to perform power conditioning, such as power factor control (PFC). Furthermore, if a second inverter 22 is provided for AC welding-type processes, a third processor 38 is included to control the output inverter 22 to provide the desired AC power characteristics to perform an AC welding-type process.

Although, as illustrated in FIG. 1, in traditional welding-type systems, each actively controlled process has a dedicated processor, these processors 30, 36, 38 and the associated resources (memory, and the like) are often referred to collectively as a controller 40. To this end, while it is generally accurate to refer to a single controller architecture 40 as controlling the processes of a welding-type power source, it is more accurate to show the "controller 40" as including a number of specially-configured, dedicated processing devices, each assigned to controlling a specific task during the welding-type process.

Traditionally, these processors 30, 36, 38 are microprocessors, similar to those used in consumer desktop computing devices. Recently, some of the processors 30, 36, 38 have been replaced with more specialized processors, generally referred to as digital signal processors (DSP). For example, some have replaced the general microprocessor 30 used to control the primary inverter 16 with a DSP. Such configurations have been used in both welding and plasma cutting systems.

However, like microprocessors, these configurations employing DSPs dedicate a processing device to each process. That is, one microprocessor or DSP is dedicated to power conditioning (if included), primary inverter control and/or welding process control, and secondary inverter control (if included). This is because DSPs, like microprocessors, employ a "serial" architecture.

In an effort to complete more tasks per unit time, some manufacturers have reduced the time per unit task by raising the clock frequency. However, this solution has upper limits.

That is, while both microprocessors and DSPs may appear to perform processing tasks in "parallel" due to high operating clock frequencies, these devices are fundamentally designed and limited to executing one specific task at any specific time.

Some processor systems have been developed that include multi- or hyper-threading architectures and dual- or multi-core architectures. These systems attempt to mimic non-serial (parallel) processing by forcing sequential programming into a divide and conquer methodology. However, this solution is limited by the ability to divide the program (for example, whether the program is "threaded") and the ability to effectively utilize shared resources (for example, system memory, and the like).

In a further attempt to overcome this fundamental limitation of processing serialization, some processor architectures have been developed that include on-board peripherals designed to allow the "central core(s)" of the processor to off-load tasks, thus, allowing the processor to complete more tasks per unit time. However, all the tasks/programs must be first processed by the central core. Accordingly, such systems are limited by the need to have the central core "touch" each task/program in order to achieve the over-all system objectives.

In addition to these architectural limitations of the "classical" DSP processor, DSPs (and microprocessors) are the limited by the available programming languages. Specifically, in an effort to make the languages more standardized and portable, numerous compromises have been made with respect to the way data can be manipulated. One example is standardization of the sizes available for data "packets" in bits. In C-based languages, the available bits, bytes, integers, and words are loosely defined by the language and made concrete by the architecture of the processor. In a typical application, the values of each are fixed such that a bit is a single Boolean value, a byte is 8 bits, an integer is 16 bits, and. a word or "long" is 32 bits.

Under these constraints, for example, if a particular variable requires, at most, 17 bits, a word having 32 bits must be used to hold the value and the programmer must manipulate the extra 15 bits, despite being unneeded. As a further example of the architectural limitation of these processors, if a 16-bit wide internal data bus is included, the variable (which only requires, at most, 17 bits) can only be handled across two successive operations. Conversely, if a 32 bit internal bus is included to alleviate this problem, system resources are still inefficiently utilized because gates that could otherwise utilized are manipulating 8 or 16-bit values.

Therefore, it would be desirable to have a system and method for efficiently controlling multiple processes in a welding-type power source.

BRIEF SUMMARY OF THE INVENTION

The present invention overcomes the aforementioned drawbacks by providing a system and method for controlling multiple actively-controlled processes in a welding-type power source with a single processing device that can be segregated to perform each process in parallel. The segregation and hardware architecture of the processing device can be specifically customized to the specific task or process so that resources are utilized efficiently.

In accordance with one aspect of the present invention, an welding-type power source is disclosed that includes a power conditioner configured to receive power from a power source and condition the power to have characteristics within a predefined set of thresholds and an inverter configured to receive the conditioned power from the power conditioner and convert the conditioned power to AC power. The welding-type power source also includes a rectifier configured to convert the AC power to DC welding-type power to drive a welding-type process and a processor segregated into at least two functional modules. A first functional module is configured to control the power conditioner to condition the power to have characteristics within the predefined set of thresholds and a second functional module is configured to control the inverter to convert the conditioned power to AC power.

In accordance with another aspect of the present invention, an welding-type power source is disclosed that includes a power conditioner configured to condition an AC power, a first rectifier configured to convert the AC power to DC power, and an inverter having a plurality of switches configured to receive the DC power from the rectifier and convert the DC power to AC power. The welding-type power source also includes a second rectifier configured to convert the AC power to a DC welding-type power and an FPGA-based processor having a first functional module configured to control operation of the power conditioner and a second functional module configured to control operation of the inverter.

In accordance with yet another aspect of the present invention, a welding-type device is disclosed that includes a power input configured to receive AC power, a first rectifier configured to convert the AC power to DC power, and an inverter configured to receive the DC power from the rectifier and convert the DC power to AC power. The welding-type device also includes a second rectifier configured to receive the AC power from the inverter and convert the AC power to a welding-type power and an FPGA-based processor having first and second decoupled functional modules having different word lengths and wherein the first decoupled functional module is configured to control operation of the inverter.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
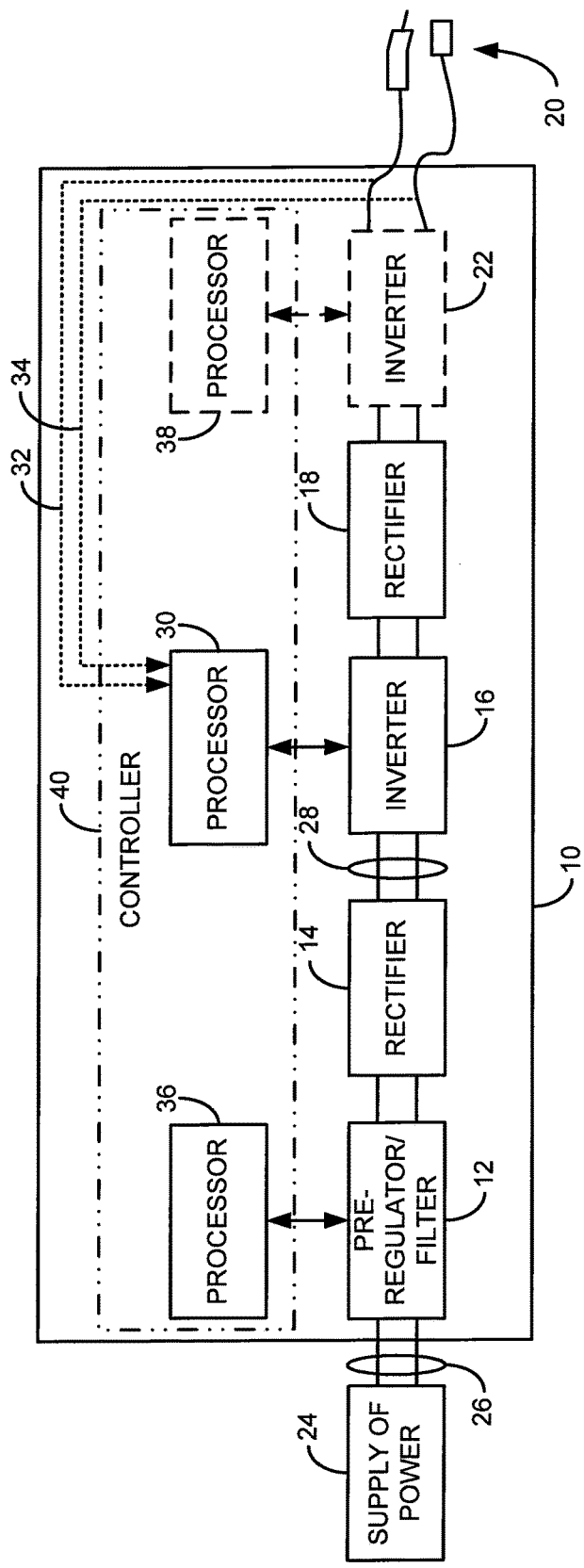
FIG. 1 is a schematic illustration of an welding-type power source of a welding-type device.
Figure 2:
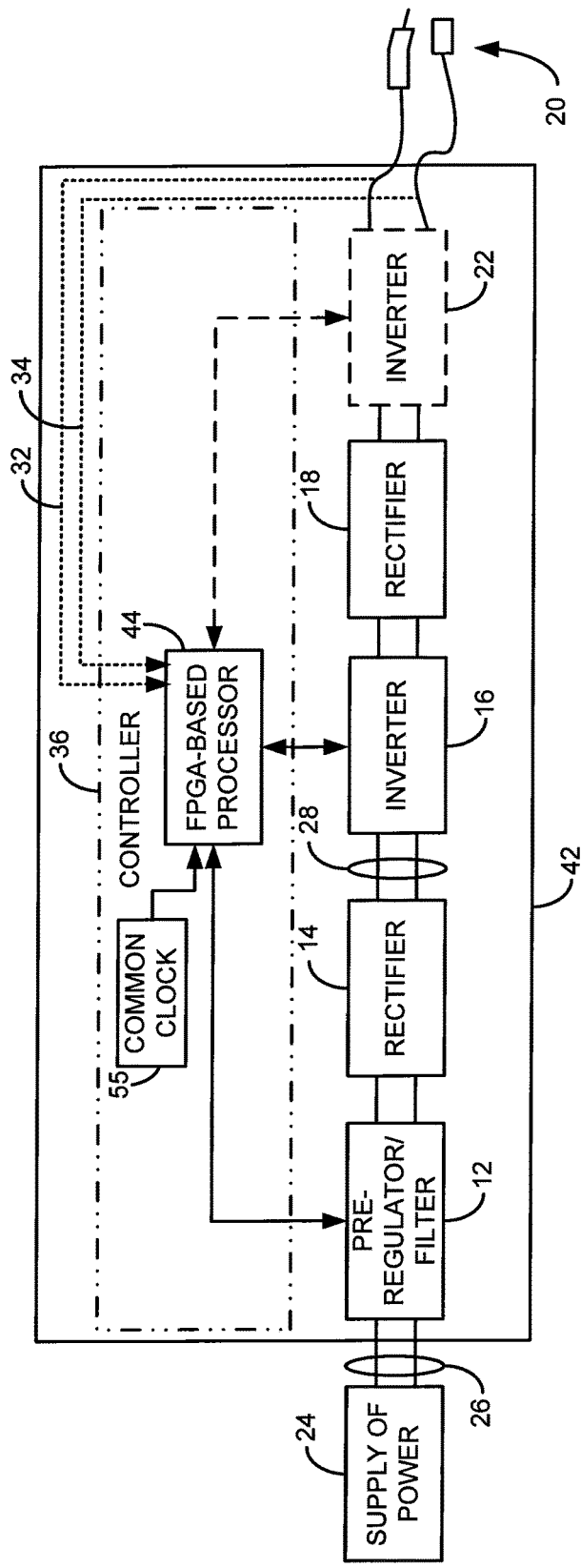
FIG. 2 is a schematic illustration of an welding-type power source of a welding-type device including a processing device capable of controlling multiple processes in parallel in accordance with the present invention.

Referring now to FIG. 2, an welding-type power source system 42, again includes a pre-regulator/filter 12, a first rectifier 14, an inverter 16, and a second rectifier 18 that is connected to an output 20. Additionally, the systems 42 may include a second inverter 22 in order to provide alternating current (AC) welding-type power. The system 42 may be designed to be connected to a utility grid transmission power line 26 or may include an integrated generator (not shown) that acts as a source of power. As described above, the AC power from the supply of power 20 is conditioned by the pre-regulator/filter 12, delivered to the rectifier 14 to convert the AC power to DC power, and delivered to a DC bus 28. thereafter, the inverter 16 positioned between the positive and negative buses of the DC bus 28 converts the DC power to AC power that is delivered to the second rectifier 18 and, ultimately, to the output 20 with the desired voltage and current characteristics. To this end, the welding-type power source system 42 is similar to that described above with respect to FIG. 1.

Unlike prior art systems, the welding-type power source system 42 includes an field programmable gate array (FPGA) based processor 44 that is designed to control more than one actively controlled process during operation of the welding-type power source system 42. As will be described, the FPGA-based device or processor 44 is capable of controlling the pre-regulator/filter 12 (and/or other power conditioning devices), the primary inverter 16, and, if included, a secondary inverter 22, as well as other processes.

The FPGA-based processor 44 is a semiconductor device. However, unlike microprocessors or DSPs that include "soft cores" capable of running "code", the FPGA-based processor 44 includes hardware logic components or "logic blocks" and programmable interconnects. The logic blocks can be configured or programmed to function as a logic gate, for example AND, OR, or XOR. Furthermore, the logic blocks can be combined and programmed to act as a complex logical device, such as a decoder. To this end, the FPGA-based processor 44 is programmed using a hardware description language, such as Very high speed integrated circuit Hardware Description Language (VHDL).

Figure 3:
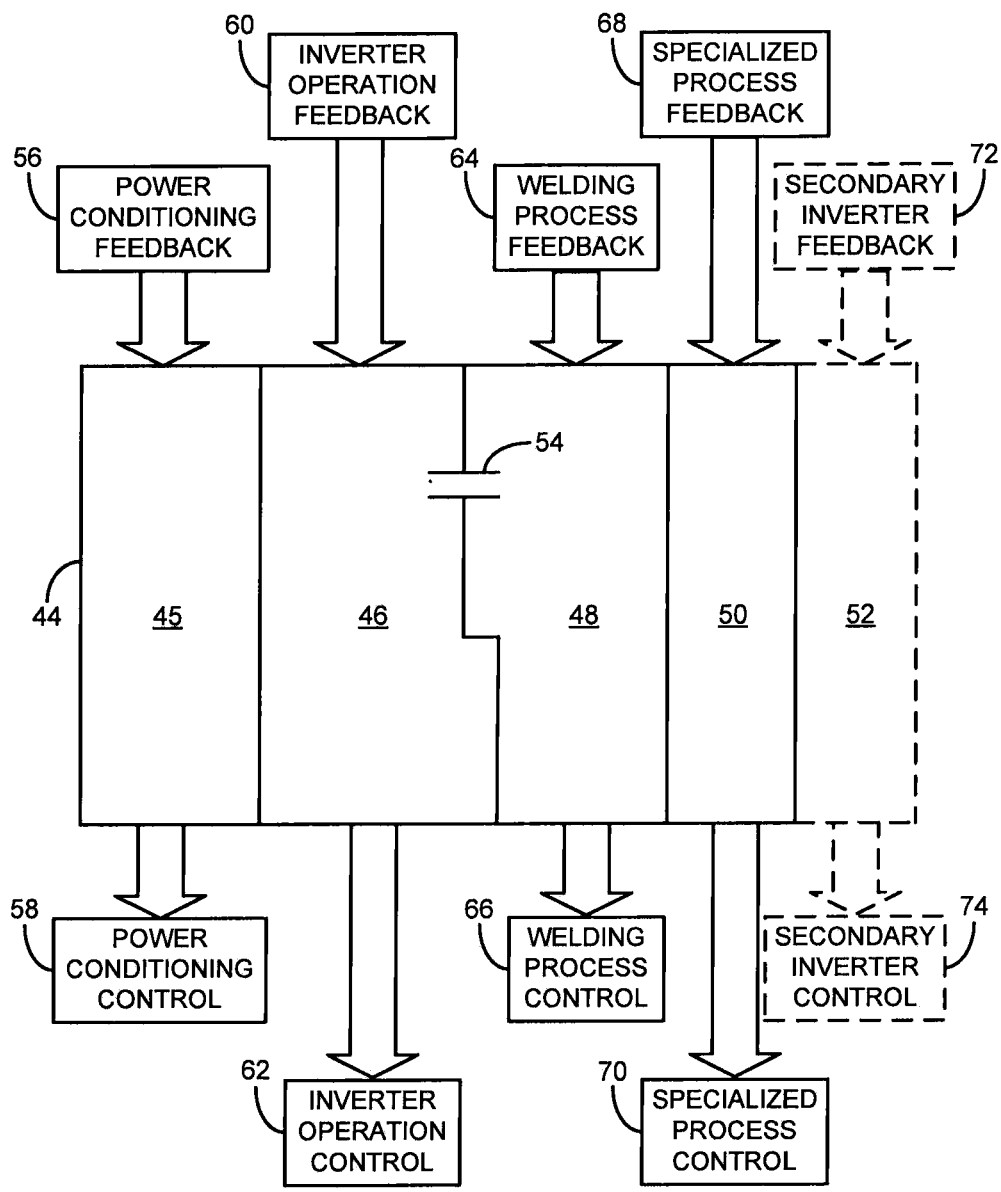
FIG. 3 is a schematic illustration of an FPGA-based processor segmented into a plurality of functional modules, in accordance with the present invention.

Referring now to FIG. 3, using VHDL, the FPGA-based processor 44 can be programmed to segregate the logic blocks in a manner specifically designed to optimized resources and ultimate flexibility for each specific task that the FPGA-based processor 44 controls. This is done on a high level by segregating the FPGA-based processor 44 into hardware sections or "functional modules" 45, 46, 48, 50, 52, where each functional module 45, 46, 48, 50, 52 is dedicated to a specific process. As defined herein, a functional module includes a section of the FPGA-based processor 44 that is programmed to perform a specific task and, except for defined shared resources or communications paths 54, is isolated from other portions of the FPGA-based processor 44.

To this end, the FPGA-based processor 44 provides true parallel or "concurrent" operation of functional modules and processes within each functional module 45, 46, 48, 50, 52. Each functional module 45, 46, 48, 50, 52 operates in true parallel form linked together by a port map and, in accordance with one embodiment, a common clock 55, as illustrated in FIG. 2. For example, the clock may have a frequency of approximately 80 MHz. However, this is just one example of a possible clock frequency value and is implementation specific. In general, the clock frequencies can be much higher. However, unlike DSPs or other microprocessors that are incapable of true parallel processing and use high clock frequencies in an attempt to overcome this limitation, the functional modules 45, 46, 48, 50, 52 are capable of concurrent operation. Therefore, the functional modules 45, 46, 48, 50, 52 can perform the same amount of processing operations in the same amount of time as a DSP or microprocessor using a lower clock frequency.

As stated above, each functional module 45, 46, 48, 50, 52 operates in true parallel form linked together by a port map. The port map is an HDL term used to describe the communication links between functional modules 45, 46, 48, 50, 52. Generally, if each functional module 45, 46, 48, 50, 52 is represented as a custom integrated circuit embodied within the overall FPGA component, then the port map completes the analogy by acting as the method used in the HDL to define the virtual "pins" of the device. These virtual pins can be a Boolean type, taking on only binary values, or the virtual pins can be vectors, similar to an "address bus" in a microprocessor-based system. "Signals" are used to create nets, similar to a schematic, that connect these virtual pins together. Some early methods of hardware development for these programmable devices, which are still utilized in some cases, still use a schematic to build or define the functionality inside the part.

As illustrated in FIG. 3, power conditioning feedback 56 related to operation of the pre-regulator/filter 12 of FIG. 2 is delivered to one segmented functional module 45 that is specifically designed to process the power conditioning feedback 56 and generate operational commands based on its specific logical hardware configuration for controlling the power conditioning processes 58. Similarly, another segmented functional module 46 is configured to receive inverter operation feedback 60, process the feedback based on its specific logical hardware configuration, and generate inverter operation control commands 62. To this end, referring to FIGS. 2 and 3, control of the inverter 16 and control of the pre-regulator/filter 12 is performed by two separate functional modules 45, 46 that are isolated from one another.

Furthermore, specific functional modules can be created for processes that are often combined, such as pulse width modulation of the inverter 16 and overall control of the welding-type process. For example, as described above, one functional module 46 may be created that is designed to control the operation of the inverter 16. While in prior art systems, one microprocessor or DSP is often dedicated to controlling the inverter 16 and receiving operational feedback via feedback lines 32, 34, in accordance with one embodiment, one functional module 46 may be provided for controlling pulse width modulation of the inverter 16 and another functional module 48 may be provided to receive welding process feedback 64 and generate welding process control commands 66. In accordance with this embodiment, it is contemplated that a communications path 54 may be provided between the functional modules 46, 48 to coordinate operations. For example, to allow the functional module 48 to be able to communicate a need to increase the overall voltage output by extending the pulse width ON time of the inverter 16.

Further still, highly specialized functional modules 50 can be created for sub-processes, such as receiving serial communication commands/requests 68, processing the commands/requests, and communicating serial communication protocols 70, and the like. Likewise, if a secondary inverter 22 is included to generate an AC welding-type power, a separate functional module 52 may be provided to receive operational feedback 72 related to the secondary inverter 22 and generate secondary inverter control command 74. Of course, additional functional modules are contemplated for a wide variety of processes and sub-processes.

By segregating the FPGA-based processor 44 into functional modules 45, 46, 48, 50, 52, true parallel processing can be achieved and low level optimization and flexibility can be realized. By way of the example described above with respect to FIG. 1, if a 17 bit value is a maximum variable length needed for one process, the segment dedicated to that one process can have a word length defined as 17 bits. Furthermore, if an 18 bit word length was defined but the 18$^{th}$ bit was never used, a compiler can be used that, during the programming/segregation process re-allocates the unused bit elsewhere.

Therefore, each functional module is "de-coupled" from the other functional modules and only shares resources or communicates when specific programmed to do so. The FPGA-based processor 44 has no shared resources, no single core doing multiple functions, no communication passes between functional modules, unless defined by the hardware description language. Therefore, one functional module cannot impact another functional module unless specifically defined by the HDL.

As described above, it is contemplated that a shared clock resource may be utilized. While it is quite common to use a common clock, it is also contemplated that different clock "domains" may be utilized, where the functional modules may run at different clock frequencies or based on different clock sources. Additionally, it is contemplated that a "domain crossing" capability may be provided. In this case, additional sub-blocks can be included to synchronize data transfers between different clock domains.

Therefore, the above-described system and method is provided that is capable of controlling multiple actively-controlled processes in a welding-type power source with a single processing device that is segregated into a plurality of functional modules to perform each process in parallel. The segregation and hardware architecture of the processing device can be specifically customized to the specific task or process so that resources are utilized efficiently.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A welding-type power source comprising:
a power conditioner configured to receive power from a power source and condition the power to have characteristics within a predefined set of thresholds;
an inverter configured to receive the conditioned power from the power conditioner and convert the conditioned power to AC power;
a rectifier configured to convert the AC power to DC welding-type power to drive a welding-type process; and
a field programmable gate array (FPGA) processor segregated into at least two functional modules each configured to perform a specific task;
wherein a first functional module controls the power conditioner to condition the power to have characteristics within the predefined set of thresholds, and a second functional module controls the inverter to convert the conditioned power to AC power.

2. The welding-type power source of claim 1 wherein second functional module is configured to control switching signals communicated to the inverter to convert the conditioned power to AC power.

3. The welding-type power source of claim 1 further comprising a common clock providing a clock signal to the first functional module and the second functional module.

4. The welding-type power source of claim 1 wherein the first functional module and the second functional module operate independently in parallel.

5. The welding-type power source of claim 1 further comprising a cross-communications path between the first functional module and the second functional module.

6. The welding-type power source of claim 1 wherein the first functional module and the second functional module have differing word length definitions.

7. The welding-type power source of claim 1 further comprising another inverter configured to convert the DC welding-type power to AC welding-type power and wherein the processor includes a third functional module configured to control the another inverter.

8. The welding-type power source of claim 1 wherein the welding-type process includes at least one of a welding process, a plasma-cutting process, and an induction-heating process.

9. An welding-type power source comprising:
a power conditioner configured to condition an AC power;
a first rectifier configured to convert the AC power to DC power;
an inverter having a plurality of switches configured to receive the DC power from the rectifier and convert the DC power to inverted AC power;
a second rectifier configured to convert the inverted AC power to a DC welding-type power to drive a welding-type process; and
an FPGA-based processor having a first functional module that controls operation of the power conditioner, a second functional module that controls operation of the inverter, a third functional module that controls the welding-type process, and a port map linking at least two of the first, second, and third functional modules.

10. The welding-type power source of claim 9 wherein the first functional module and the second functional module are decoupled and operate independently.

11. The welding-type power source of claim 9 wherein second functional module is configured to control switching of the plurality of switches to convert the DC power to AC power.

12. The welding-type power source of claim 9 further comprising a cross-communications path between the first functional module and the third functional module.

13. The welding-type power source of claim 9 further comprising a cross-communications path between the first functional module and the second functional module.

14. The welding-type power source of claim 9 wherein the first functional module and the second functional module have differing word length definitions.

15. A welding-type device comprising:
a power input configured to receive AC power;
a first rectifier configured to convert the AC power to DC power;
an inverter configured to receive the DC power from the rectifier and convert the DC power to inverted AC power;
a second rectifier configured to receive the inverted AC power from the inverter and convert the inverted AC power to a welding-type power;
at least one of a power conditioner and another inverter; and
an FPGA-based processor having first and second decoupled functional modules having different word lengths, wherein the first and second decoupled functional modules are linked together by a port map, wherein the first decoupled functional module controls operation of the inverter, and wherein the second functional module controls one of the power conditioner and the another inverter.

16. The welding-type device of claim 15 wherein the first functional module and the second functional module operate independently in parallel.

17. The welding-type device of claim 15 wherein the FPGA-based processor is free of soft cores.

\* \* \* \* \*